United States Patent
Maffeis

(10) Patent No.: US 8,091,938 B2
(45) Date of Patent: *Jan. 10, 2012

(54) PNEUMATIC LINEAR GRIPPER

(75) Inventor: Giuseppe Maffeis, Roncadelle (IT)

(73) Assignee: Gimatic S.p.A., Roncadelle (Brescia) (IT)

( * ) Notice: Subject to any disclaimer, the term of this patent is extended or adjusted under 35 U.S.C. 154(b) by 309 days.

This patent is subject to a terminal disclaimer.

(21) Appl. No.: 12/422,502

(22) Filed: Apr. 13, 2009

(65) Prior Publication Data

US 2009/0278369 A1 Nov. 12, 2009

(30) Foreign Application Priority Data

May 9, 2008 (IT) .............................. BS08A000096

(51) Int. Cl.
*B25J 15/00* (2006.01)
(52) U.S. Cl. ...................... 294/207; 294/119.1; 294/907
(58) Field of Classification Search .................... 294/88, 294/119.1, 907; 901/37, 46; 269/32, 34
See application file for complete search history.

(56) References Cited

U.S. PATENT DOCUMENTS

| | | | | |
|---|---|---|---|---|
| 4,593,948 A * | 6/1986 | Borcea et al. | ................... | 294/88 |
| 4,607,873 A * | 8/1986 | Nusbaumer et al. | ............ | 294/88 |
| 6,092,848 A * | 7/2000 | Maffeis et al. | .................. | 294/88 |
| 6,318,779 B1 * | 11/2001 | Hanne et al. | .................... | 294/88 |
| 6,471,200 B2 * | 10/2002 | Maffeis | ........................... | 269/34 |
| 6,547,258 B2 * | 4/2003 | Mandokoro et al. | ......... | 279/4.12 |
| 6,827,381 B1 * | 12/2004 | Reichert et al. | ................. | 294/88 |
| 6,830,273 B2 * | 12/2004 | Michler et al. | ................... | 294/88 |
| 7,258,378 B2 * | 8/2007 | Bellandi et al. | ................. | 294/88 |
| 7,883,132 B2 * | 2/2011 | Maffeis | ........................... | 294/88 |

* cited by examiner

*Primary Examiner* — Dean Kramer
(74) *Attorney, Agent, or Firm* — McGlew and Tuttle, P.C.

(57) ABSTRACT

A pneumatic linear gripper, including a gripper body (11) with a chamber (15), a piston (12) moving alternately in the chamber (15) and a pair of jaws (13) sliding associated and movable in opposite directions with piston via a translation device (20). The gripper body (11) is formed of two elements (14), or semi-shells, joined face to face to define at the same time the chamber (15) for the piston (12) and the sliding guides (16) for the jaws (13). The piston (12) is composed of a first component (21), made of a plastic material, bearing seals and a second component (22), made of metal, associated with the first and united, in particular integral, with the translation device (20) of the jaws in opposite directions.

11 Claims, 3 Drawing Sheets

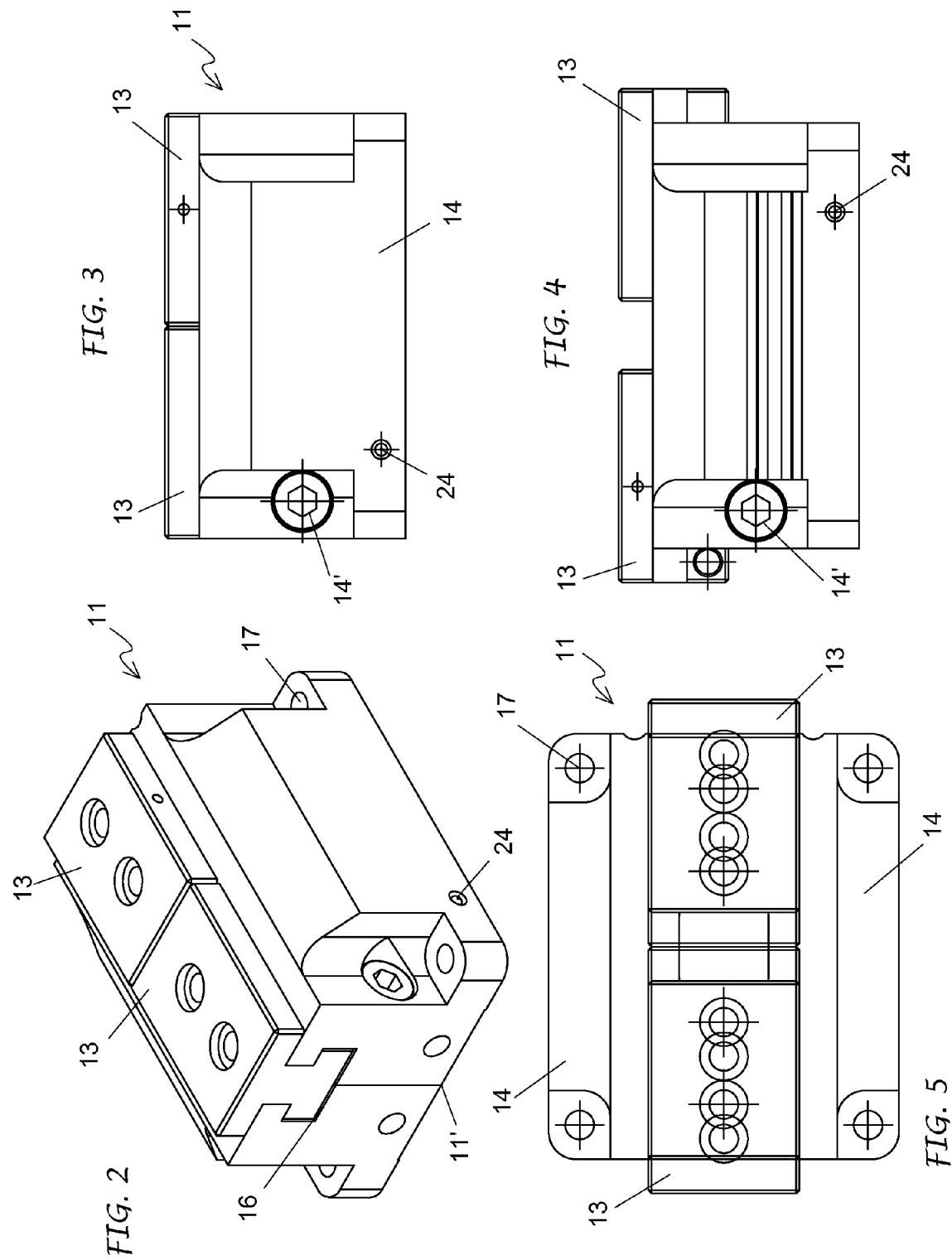

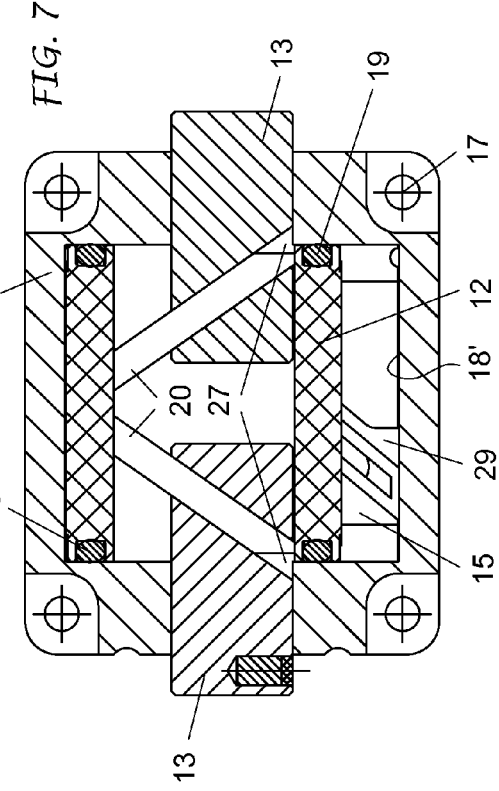
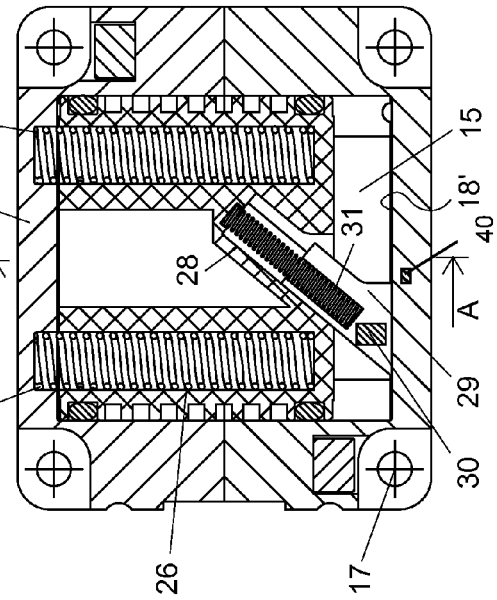
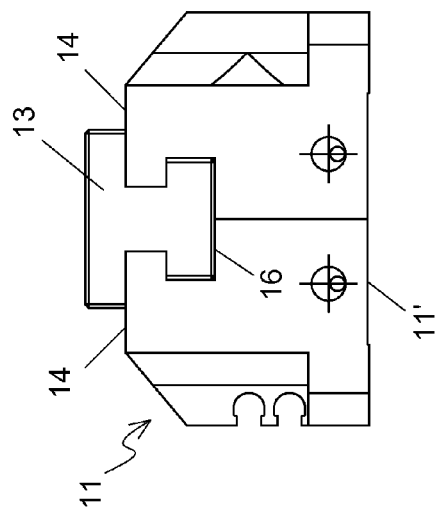

PNEUMATIC LINEAR GRIPPER

FIELD OF THE INVENTION

This invention concerns, in general, the pneumatic grippers filed for gripping items, objects or various bodies during their production steps and/or manipulation and/or usage, and refers, in particular to a pneumatic gripper with a pair of gripper jaws moving linearly in opposite directions to open and close by means of a single or double acting control piston.

STATE OF THE TECHNIQUE

The linear pneumatic grippers of the type taken into consideration herein can have different configurations, sizes and power. They basically comprise a body defining a chamber, a piston positioned and moving alternately in said chamber under the action of a fluid under pressure, and a pair of gripper jaws guided in said body, associated with the piston and movable in opposite directions.

However, the known linear grippers are relatively cumbersome and heavy besides being complicated to produce. Generally, they comprise a number of elements that are made separately and then assembled with relative manufacturing and labor costs and which because of their combination can be the cause of defects in the function of the gripper. In fact, the gripper body requires at least a machining process or an insert to form the chamber for the piston and the coating of guide elements for the jaws. Furthermore, possible errors in dimensions of the individual components and/or connection tolerances may also have a negative influence on the precision, parallelism of movement and action of the jaws.

OBJECTS AND SUMMARY OF THE INVENTION

One object of this invention is to avoid the above complained about inconveniences and drawbacks, and therefore to provide a pneumatic linear gripper composed of a limited number of components and where some components are configured to carry out a dual function.

Another object of the invention is to provide a linear pneumatic gripper the assembly of which is greatly simplified and whose dimensions are significantly reduced compared with the same type of grippers, thanks to a particular configuration of the piston and translation means of the jaws.

A further object of the invention is to provide a pneumatic linear gripper comprising components that also contribute to an effective reduction in weight and costs of the tool, without however influencing its power and performance, dimensions of the more traditional grippers being equal.

Yet another object of the invention is to provide a linear gripper that can be equipped with a magnet-sensitive position sensor in a non-magnetic component of the piston, without however being fixed directly to the latter so that it does not have to be subject to dependability interferences and/or limitations on the part of metallic masses that may influence the magnetic field.

Said objects and advantages deriving from them are reached in a pneumatic linear gripper according to the preamble of claim 1, wherein the gripper body is composed of two elements or equal semi-shells, joined face to face and defining at the same time the chamber for the piston and the sliding guides for the two jaws, and wherein the piston is made up of a first component provided with gaskets sealing on the internal surface of said chamber and a second component bearing integrally means for the translation in opposite directions of the jaws between an open and a closed position in reply to the alternating movements of the piston.

Advantageously, the first component participating in the formation of the piston is made of a plastic material obtainable by molding, whereas the second component is made of metal and it is obtainable by molding or by sintering.

As a whole, the piston, apart from its length, has to its advantage a dimension in width greater than its dimension in height so much so as to have in preference a polygonal section, better if rectangular, a condition that enables the dimensions of the gripper at least above its base plane, with equal capacity, to be reduced.

In addition the first component is set up to receive one of the two elements of a magnet sensitive sensor to detect the position of the piston inside the chamber and therefore the operating position of the gripper.

In this way, the assembly of the gripper becomes simple, easy and rapid. In fact, the gripper body, which physically defines the chamber for the piston and the guides for the jaws, no longer, requires any additional guide elements and in addition it becomes smaller in size and lighter in weight, appreciable characteristics in some uses.

BRIEF DESCRIPTION OF THE DRAWINGS

This invention will however be illustrated in greater detail in the continuation of this description made in reference to the enclosed indicative and not limiting drawings, in which:

FIG. 2 is a perspective view of the assembled gripper;

FIG. 3 is a side view of the gripper with the jaws closed;

FIGS. 4 and 5 are respectively side and plan views of the gripper with the jaws open;

FIG. 6 is a head view of the gripper;

FIGS. 7 and 8 are two section views on different parallel planes to the base of the gripper; and FIG. 9 is a cross section view of the gripper according to arrows A-A in FIG. 8.

DETAILED DESCRIPTION OF THE INVENTION

Figure 1:
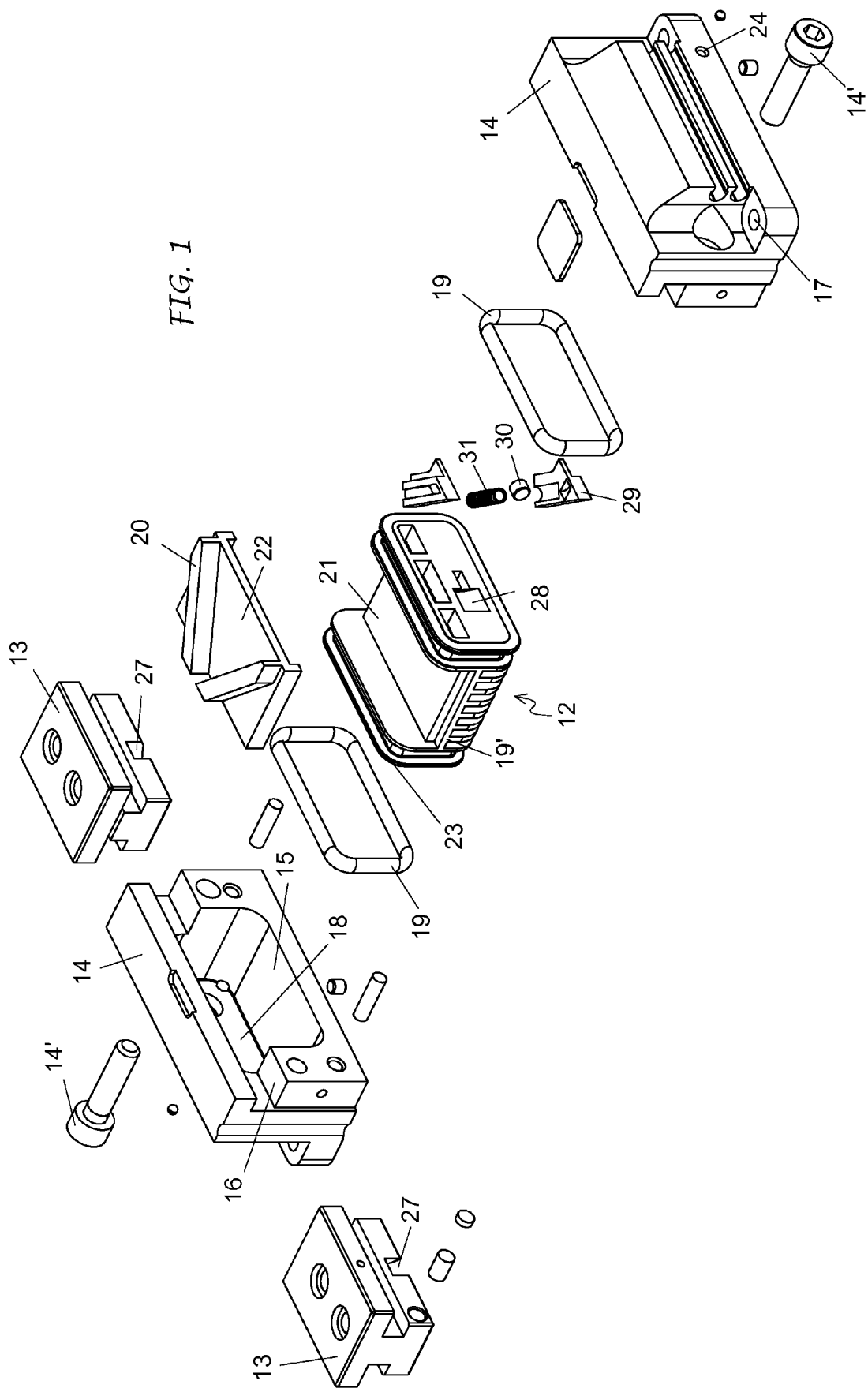
FIG. 1 an exploded view of the components of the gripper according to the invention.

As shown, the pneumatic linear gripper basically comprises a gripper body 11, a pneumatic piston 12, single or double acting, and two jaws 13, movable in opposite directions to close and open and designed to carry gripper jaws.

The gripper body 11 is formed of two elements 14, or symmetrical semi-shells, which can be completely similar and which, matching and fixed together by mechanical elements 14', such as bolts and the like, delimit at the same time a chamber 15 for the piston 12 and sliding guides 16 for the jaws 13. Also, the body 11 is externally provided with means 17 for fixing the gripper to the supports or manipulators.

The chamber 15 extends in an orthogonal direction, even if on a different level, to the sliding direction of the jaws 13 between two shoulder surfaces 18, 18'.

The pneumatic piston 12 is housed and moves in the limit of the shoulder surfaces 18, 18' in said chamber 15, it can have any shape in a cross-section, but preferably polygonal, better still rectangular, so as to have a size in width greater than its size in height. It is equipped in the usual way with seals 19 and can have lateral planes 19' to centre and guide it inside the chamber 15. Furthermore, on one of its faces translation means 20 are provided, that can be in the shape of ribs, which extend upwards towards the jaws 13 and converge in the direction of the movement of the piston 12 towards the closing position of the jaws 13.

According to a peculiar aspect of the invention—FIG. 1, 9—the piston 12 is formed of two components, a first component 21 made of a plastic material, made by moulding, and a second component 22, made of metal, made by moulding or sintering, above the first. More precisely, the second component 22 is positioned and restrained between two shoulders 23 at two opposite ends of the first component 21, and the seals 19 of the piston 12 are mounted on a level with said shoulders 23.

Furthermore, the second component 22 of the piston 12 is in the shape of a plate and it is integrated with the abovementioned translation means 20 of the jaws 13.

The pneumatic piston 12 configured in this way, even if it can be double acting, in the illustrated example it is single acting and its alternative movement is caused, in one direction, by a fluid under pressure fed to the chamber 15 through a feed hole 24 present in a wall of the gripper body 11, and in the opposite direction by at least a return spring 25 that is positioned between the first component 21 of the piston 12 and a rebate surface 18 in the chamber 15, the piston 12 being equipped with at least a housing 26 for such a spring.

The sliding guides 16 for the jaws 13 have the shape of longitudinal slots on the opposite faces of the two elements or semi-shelves 14 forming the gripper body 11.

The two jaws 13 are held in said guides 16 and able to slide longitudinally. For this purpose they have grooves 27 sloping respectively to the translation means 20 and join up to these means so that the alternating movements of the piston inside the chamber 15 correspond to the linear movements in opposite directions, that is the opening and closing of the jaws 13.

According to another aspect of the invention, at one end of the first component 21 of the piston facing a shoulder surface 18' of the chamber, a slot 28 is provided sloping in regard to the movement direction of the piston and which can be achieved directly from the moulding of said component. A cursor 29 is housed and movable in the slot 28, and is made of a nonmagnetic material, housing a permanent magnet 30. The cursor 29 is stressed by a spring 31 tending to push it normally towards the outside of said slot 28 in contact with the abovementioned rebate surface 18'. So, in answer to the movements of the piston the cursor 29 moves axially in the relative slot and the magnet 30 follows it moving linearly along the rebate surface 18' in an orthogonal direction to the movement direction of the piston, that is parallel to the movement direction of the jaws. In this way, the magnet 30 in association with a magnet-sensitive sensor 40—well known in itself—applied to the gripper body is able to detect the operating movements of the piston and consequently the open/closed position of the jaws.

The invention claimed is:

1. A pneumatic linear gripper, comprising:
a gripper body with a chamber, a piston provided with seals and moving alternately in said chamber under the action of a fluid under pressure, and a pair of gripper jaws sliding in said gripper body and associated with said piston, and where the piston engages with the jaws through a translation means so that the alternating movements of the piston correspond to linear movements, in opposite directions, of the jaws to open and close the jaws, said gripper body being formed of two elements, or half-shells, mated face to face to define at the chamber for the piston and sliding guides for the jaws, and said piston being composed of a first component bearing seals and a second component associated with the first component and fixed with said translation means, wherein the first component of the piston is made of a plastic material and the second component is substantially plate-shaped and made of a metal, said two components being superimposed and centered one to another.

2. Linear gripper according to claim 1, wherein the piston formed of said two components has a section with a dimension in width larger than a height thereof, said piston being substantially polygonal.

3. Linear gripper according to claim 1, wherein the first component has a slot at one end thereof, said slot sloping with respect to the direction of the movement of the piston, and wherein a nonmagnetic cursor is housed in said slot bearing a magnet designed to interact with a magnet-sensitive sensor fixed to the gripper body to detect the positions of the piston.

4. Linear gripper according to claim 3, wherein said cursor is movable in said slot and rests permanently against an internal surface of said body moved by a thrust spring so as to cause a linear movement of the magnet in a parallel direction to the movement direction of the jaws in response to the movements of the piston.

5. Linear gripper according to claim 1, wherein each element, or semi-shell, defines a semi-chamber for the piston and a sliding guide for one side of the jaws, the sliding guide being in the shape of a longitudinal slot provided in the internal face of said element.

6. Linear gripper according to claim 1, wherein said chamber in the gripper body and at least the first component of the piston have lateral planes for reciprocal centering and guiding.

7. Linear gripper according to claim 1, wherein the piston is single-acting, moveable in one direction thrust by a fluid, and in the opposite direction thrust by a return spring, said spring being at least partially arranged in at least a seat in the piston.

8. Linear gripper according to claim 1, wherein the piston is double-acting movable alternately by means of a fluid fed to said chamber.

9. A pneumatic linear gripper, comprising:
a gripper body comprising a chamber, a piston provided with seals and moving alternately in said chamber under action of a fluid under pressure, and a pair of gripper jaws sliding in said gripper body and associated with said piston, said piston engaging with the jaws via a translation means such that the alternating movements of the piston correspond to linear movements, in opposite directions, of the jaws to open and close the jaws, said gripper body comprising two elements, or half-shells, mated face to face to define at the chamber for the piston and sliding guides for the jaws, said piston comprising a first component bearing seals and a second component associated with the first component and fixed with said translation means, wherein the first component of the piston is made of a plastic material and the second component is substantially plate-shaped and made of a metal, said two components being superimposed and centered one to another, said translation means being in the form of converging ribs, which extend upwards from a face of said component and engage with grooves converging in the same direction of said translation means.

10. A pneumatic linear gripper, comprising:
a gripper body comprising a chamber, a piston provided with seals and moving alternately in said chamber under action of a fluid under pressure, and a pair of gripper jaws sliding in said gripper body and associated with said piston, said piston engaging with the jaws via a translation means such that the alternating movements of the piston correspond to linear movements, in opposite directions, of the jaws to open and close the jaws, said gripper body comprising two elements, or half-shells, mated face to face to define at the chamber for the piston and sliding guides for the jaws, said piston comprising a first component bearing seals and a second component associated with the first component and fixed with said translation means, said first component having a slot at one end thereof, said slot sloping with respect to the direction of the movement of the piston, wherein a nonmagnetic cursor is housed in said slot bearing a magnet designed to interact with a magnet-sensitive sensor fixed to the gripper body to detect the positions of the piston.

11. A pneumatic linear gripper, comprising:

a gripper body comprising a chamber, a piston provided with seals and moving alternately in said chamber under action of a fluid under pressure, and a pair of gripper jaws sliding in said gripper body and associated with said piston, said piston engaging with the jaws via a translation means such that the alternating movements of the piston correspond to linear movements, in opposite directions, of the jaws to open and close the jaws, said gripper body comprising two elements, or half-shells, mated face to face to define at the chamber for the piston and sliding guides for the jaws, said piston comprising a first component bearing seals and a second component associated with the first component and fixed with said translation means, said first component having a slot at one end thereof, said slot sloping with respect to the direction of the movement of the piston, wherein a nonmagnetic cursor is housed in said slot bearing a magnet designed to interact with a magnet-sensitive sensor fixed to the gripper body to detect the positions of the piston, said cursor being movable in said slot and resting permanently against an internal surface of said body moved by a thrust spring so as to cause a linear movement of the magnet in a parallel direction to the movement direction of the jaws in response to the movements of the piston.

* * * * *